(12) United States Patent
Curry

(10) Patent No.: US 6,201,560 B1
(45) Date of Patent: *Mar. 13, 2001

(54) MULTIBEAM MODULATION DRIVER FOR A HYPERACUITY PRINTER

(75) Inventor: Douglas N. Curry, Menlo Park, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,988

(22) Filed: May 28, 1998

(51) Int. Cl.[7] ........................................................ B41J 2/47
(52) U.S. Cl. ............................ 347/240; 347/251; 347/131
(58) Field of Search ..................................... 347/240, 251, 347/252, 40, 41, 130, 131, 235, 253, 261, 254; 358/299, 300, 448, 459

(56) References Cited

U.S. PATENT DOCUMENTS

| | | | |
|---|---|---|---|
| 5,485,289 | 1/1996 | Curry | 358/448 |
| 5,574,832 * | 11/1996 | Towery et al. | 347/40 |
| 5,617,132 | 4/1997 | Fisli | 347/235 |
| 5,617,133 | 4/1997 | Fisli | 347/261 |
| 5,638,110 | 6/1997 | Curry et al. | 347/253 |
| 5,648,810 * | 7/1997 | Tanuma et al. | 347/240 |
| 5,691,760 * | 11/1997 | Hosier et al. | 347/238 |
| 5,696,604 | 12/1997 | Curry | 358/459 |
| 5,805,304 * | 9/1998 | Sekine | 358/448 |

* cited by examiner

Primary Examiner—N. Le
Assistant Examiner—Lamson D. Nguyen
(74) Attorney, Agent, or Firm—Oliff & Berridge, PLC

(57) ABSTRACT

A modulator drive function, for a hyperacuity laser printer that produces text and line art and halftones from numerically sampled input, incorporates device dependent characteristics, such as xerographic development and laser spot size, to position these edges precisely. The modulation drive function converts $r,\theta$ channel coordinates to drive values for each scan within the span of its own channel pitch. A spline-based edge reproduction curve (ERC) compensates for slowscan phase errors and a temporal bias compensates for fastscan spot size. An electronic digital-to-analog converter, pulse width modulator or shift register can be used to control exposure.

16 Claims, 16 Drawing Sheets

MULTIBEAM MODULATION DRIVER FOR A HYPERACUITY PRINTER

BACKGROUND OF THE INVENTION

1. Field of Invention

The invention relates to a printer architecture. More particularly, this invention relates to a hyperacuity printer architecture. Specifically, this invention relates to a method and system for driving a printing element in a hyperacuity laser printer.

2. Description of Related Art

According to human visual research, the frequency response or resolution of a printing system need only exceed the resolving power of the human visual system. Such resolving power is known as visual acuity. However, there are human visual considerations that require the placement of edges 10–60 times more accurately than that indicated by frequency resolution considerations. These requirements are based on hyperacuity, or the visual system's ability to differentiate locally misaligned edges to a much greater extent than the inter-receptor spacing of the eye. In this case, it is not the frequency response (resolution) of the visual system that is most important, but the ability to reckon edges with high precision. Therefore, placing edges or transitions in images in both a fast scan direction and a process, or slow scan, direction with precision greater than that of the actual printer resolution is necessary. "Hyperacuity Laser Imager" by Douglas N. Curry, Journal of Electronic Imaging, April, 1993, vol. 2(2), pgs. 138–146, herein incorporated by reference in its entirety, provides a detailed description of the relationship between the human visual system and printer resolution.

Two contrasting techniques have evolved over the last two decades to provide high image quality in laser printing, one based on resolution and the other on phase. High resolution platemakers and prepress printers use spot sizes that are the reciprocal of their binary resolutions to produce excellent image quality. These printers are expensive and slow. However, the resolutions of these printers can approach a pleasing 3,000 to 4,000 dots or spots per inch. Desktop laser printers, on the other hand, are more cost constrained and therefore use lower resolution spot sizes and scan frequencies, such as 600 dots per inch. These printers impart high quality to their images by using phase information from the source image to simulate higher resolution. These printers do not improve true image resolution beyond the physical limit of spot size and scan frequency. Rather, these printers obtain high quality through the precise positioning of edges.

There are several conventional techniques for driving printing elements. The template matching technique provides one or more templates, and looks for particular image portions that match one of the templates. Based on the matched template, an edge position is estimated. This information is then output to render edge information, which is used to drive a print element. The template matching technique is further described in U.S. Pat. No. 5,329,599 to Douglas N. Curry, which is incorporated herein by reference in its entirety.

Another technique for driving a printing element involves postscript decomposers, which use stored image information. A postscript image is rendered or converted to a bytemap image. The rendered bytemapped image is output to the printer to drive the print element.

SUMMARY OF THE INVENTION

Conventional techniques for driving a printing element do not keep track of edges. Rather these techniques instead turn bits on and off in a resolution grid. Thus, a device that uses edges as source information, and is thus capable of high printing accuracy without using higher resolutions, is needed.

Conventional techniques are also unable to use grayscale data to precisely locate edges and to convert the grayscale data into a bytemap usable to drive a print element. Thus, a method and apparatus for driving print elements that use grayscale data source information are also needed.

Accordingly, this invention provides a method and a system for using text and line art information generated from a sampled input image to drive printing elements.

The invention also provides a halftoning technique usable to locate edges.

Sampled grayscale pixel data is used to precisely locate edges. A thresholding technique uses two-dimensional slope and interpolated intensity data to locate edges. The edge placement data may be stored in various formats, including polar values, a linear format or as numerically sampled grayscale values.

A modulator drive device uses the edge placement values derived from the slope thresholder or halftoner and incorporates device-dependent characteristics, such as xerographic development and spot size, to precisely position the edges using a modulator drive function. A spline-based edge reproduction curve (ERC) compensates for slow scan phase errors and a temporal bias compensates for fast scan spot size. The modulator drive device determines intensity values that are used to drive the printer scan. The modulator drive device can drive many types of digital-to-analog converters, such as, for example, electronic digital-to-analog converters, pulse-width modulators or shift registers.

The method and apparatus according to this invention allow a hyperacuity data channel to drive a set of adjacent laser diodes to form a set of adjacent scan lines extending across a recording medium, where the adjacent scan lines are pitched much finer than that of the hyperacuity channel. A modulation drive device converts position coordinates to drive values for each laser diode used to form a scan line within the span, or channel pitch, of that hyperacuity channel. This provides a decompression method for generating data at higher clock speeds for the laser diodes, and increases the number of scan lines per inch in the process direction, while not adversely impacting the rasterized input data for the hyperacuity channel. This results in a practical method of implementing a high speed 2,400 dpi by 2,400 dpi or 4,800 dpi by 4,800 dpi color printer.

These and other objects of the invention will be described in or be apparent from the following description of preferred embodiments.

BRIEF DESCRIPTION OF THE DRAWINGS

The invention is described in relation to the following drawings, in which like reference symbols refer to like elements, and wherein.

DETAILED DESCRIPTION OF PREFERRED EMBODIMENTS

Figure 1:
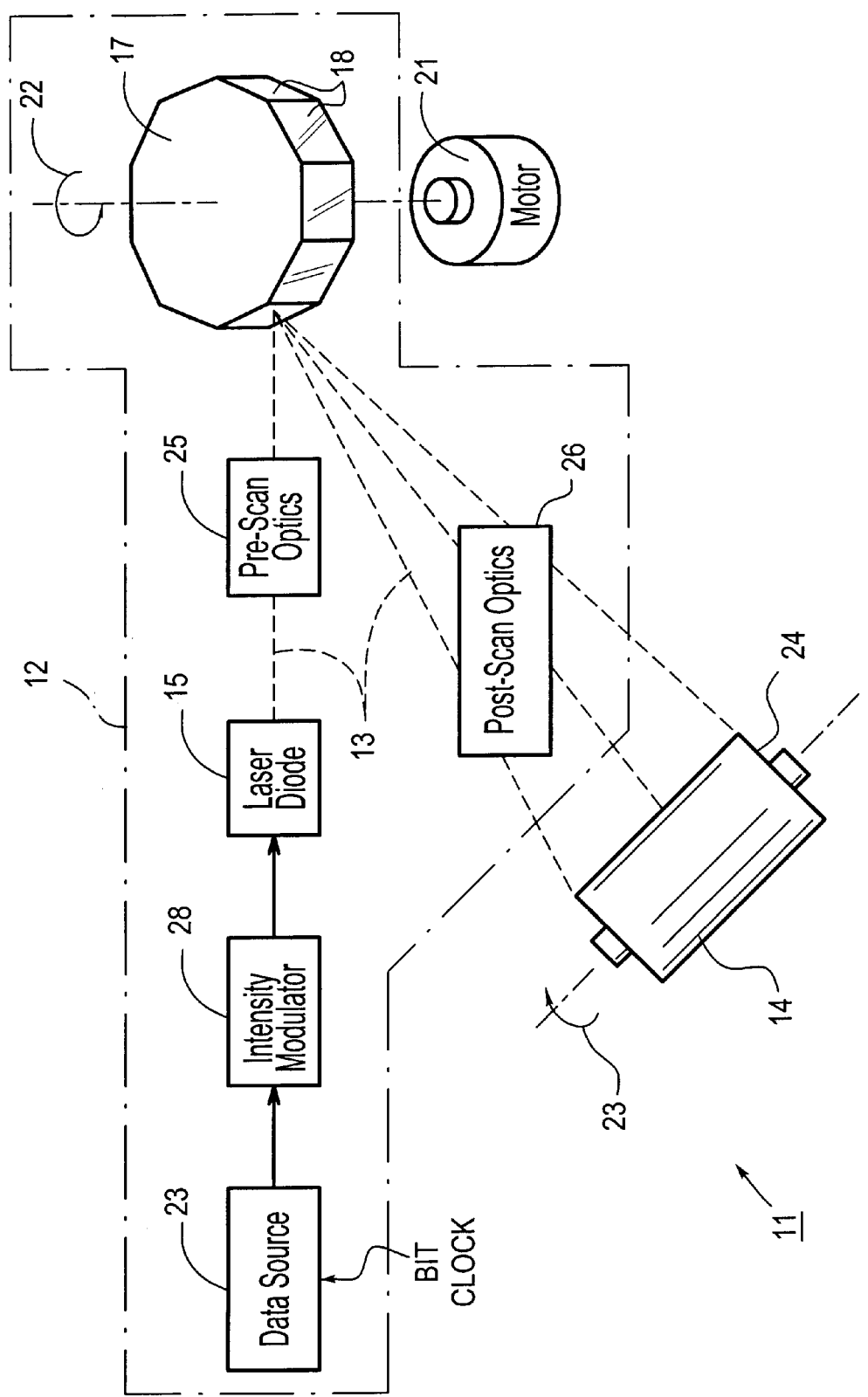
FIG. 1 is a simplified schematic diagram of a xerographic printer.

FIG. 1 shows a xerographic print engine 11 having a generally conventionally-configured raster output scanner 12. The raster output scanner 12 scans one or more data-modulated light beams 13 over a xerographic photoreceptor 14 in accordance with a predetermined raster scanning pattern. The raster output scanner 12 comprises a laser 15 and a polygon scanner 17. The laser 15 emits the one or more light beams 13 at a visible or invisible frequency, such as an infra-red frequency. The rotating polygon scanner 17 has a plurality of nearly identical, mirror-like exterior sidewalls or facets 18.

A motor 21 rotates the polygon scanner 17 about a central axis 22, as indicated by the arrow A, at a substantially constant angular velocity. The polygon scanner 17 is positioned between the laser 15 and the photoreceptor 14. The rotation of the polygon scanner 17 scans the one or more laser beams 13 across the photoreceptor 14 in a fast scan direction. The photoreceptor 14, on the other hand, is simultaneously advanced in an orthogonal process, or slow scan, direction at a substantially constant linear velocity, as indicated by the arrow B. Accordingly, the one or more laser beams 13 scan the photoreceptor 14 in accordance with a raster scan pattern. As shown in FIG. 1, the photoreceptor 14 is coated on a rotating drum 24. However, the photorceptor 14 also could be carried by a belt or any other suitable substrate.

Typically, the raster output scanner 12 additionally includes pre-scan optics 25 and post-scan optics 26 that bring the one or more laser beams 13 to a generally circular focus proximate the photoreceptor 14 and provide any optical correction that may be needed to compensate for scanner wobble, off-axis impingement of the one or more laser beams 13 and other optical irregularities. Preferably, the optical aperture of the raster output scanner 12 is sufficiently large to avoid excessively truncating the one or more laser beams 13. Accordingly, the one or more laser beams 13 are placed into a generally circular or elliptical focus with a gaussian intensity profile.

However, the broader aspects of this invention are not limited to any specific scan spot geometry or intensity profile. Accepted design principles indicate that the spatial frequency power spectrum of the scan spot profile should not have significant spatial frequency components outside the spatial frequency pass band of the imaging system. However, the scan spot can otherwise be tailored to satisfy a variety of system requirements.

High quality printing not only depends on machine noise and exposure quality, but on how much fidelity information can be passed on to the printer from the data source. The electronic circuits in the printer convert high-fidelity, sampled image data into a high-bandwidth, high-resolution binary data stream for delivery to the photoreceptor 14.

Figure 2:
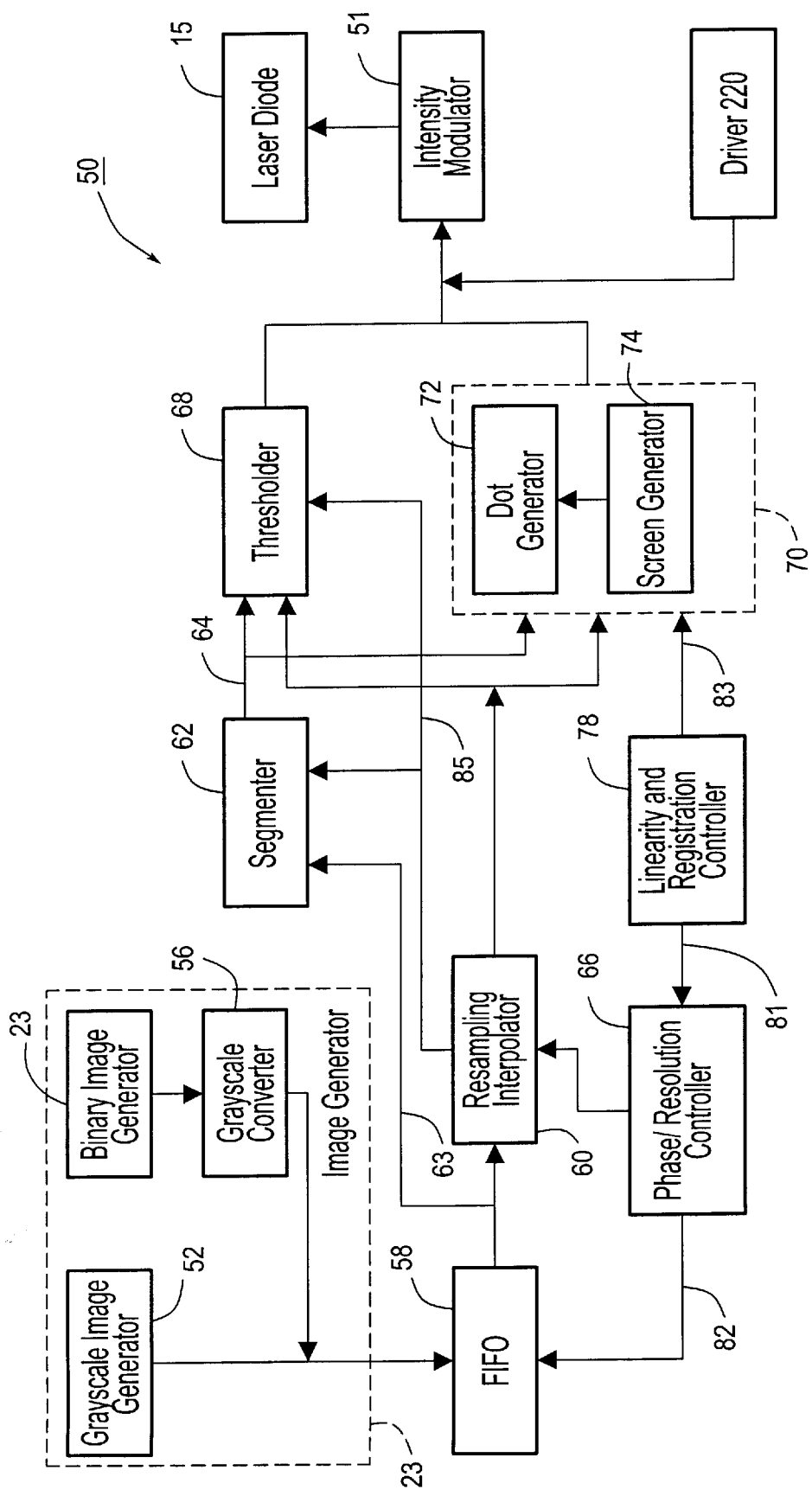
FIG. 2 is a block diagram of a hyperacuity subsystem of the xerographic printer according to this invention.

FIG. 2 shows a block diagram of a hyperacuity printing system 50. The printer 50 can be implemented generally using the raster output scanner 12 shown in FIG. 1. However, the printer 50 is not limited to the raster output scanner 12. The printer 50 inputs data from the various data sources included in the image generator 23, which includes a grayscale image generator 52, a binary image generator 54, and a grayscale converter 56. The printer 50 includes an intensity modulator 51 corresponding to this invention and the laser 15. The hyperacuity printing system 50 also includes a first-in, first-out (FIFO) memory 58, a resampling interpolator 60, a segmenter 62, a phase/resolution controller 66, a halftoner 70, a digital-to-analog (D/A) converter 76, and a linearity and registration controller 78. The halftoner 70 includes a dot generator 72 and a screen generator 74.

As shown in FIG. 2, the image generator 23 outputs the grayscale image data to the FIFO 58. The FIFO 58 stores the grayscale image data and outputs the grayscale image data to the resampling interpolator 60 and the segmenter 62 over a signal line 63 based on signals received from the phase/resolution controller 66 over a signal line 82. The phase/resolution controller 66 receives control signals from the linearity and registration controller 78 over a signal line 81. The linearity and registration controller 78 also outputs control signals over a signal line 83 to the halftoner 70.

The resampling interpolator 60 outputs linear data and two-dimensional slope information to the segmenter 62 and the thresholder 68 over one or more signal lines 85. The resampling interpolator 60 further outputs linear data and two-dimensional slope information to the thresholder 68 and resampled intensity value information to the halftoner 70 over one or more signal lines 128. The segmenter 62, using the two-dimensional slope information, provides a switching signal to the thresholder 68 and the halftoner 70 over a signal line 64. The thresholder 68 and the halftoner 70 output hyperacuity image data to the digital-to-analog converter 76. The switching signal controls whether the hyperacuity image data output by the thresholder 68 or the halftoner 70 is input by the digital-to-analog converter 70. The digital-to-analog converter 76 converts the hyperacuity image data to analog values and outputs the analog values to the laser 15 to modulate the intensity of the one or more laser beams 13.

Thus, the resampling interpolator 60, the halftoner 70, the thresholder 68 and the digital-to-analog converter 76 act together to convert the sampled image data into a high-bandwidth, high-resolution data stream for delivery to the photoreceptor 14 by modulating the one or more laser beams 13 of the laser 15.

Figure 3:
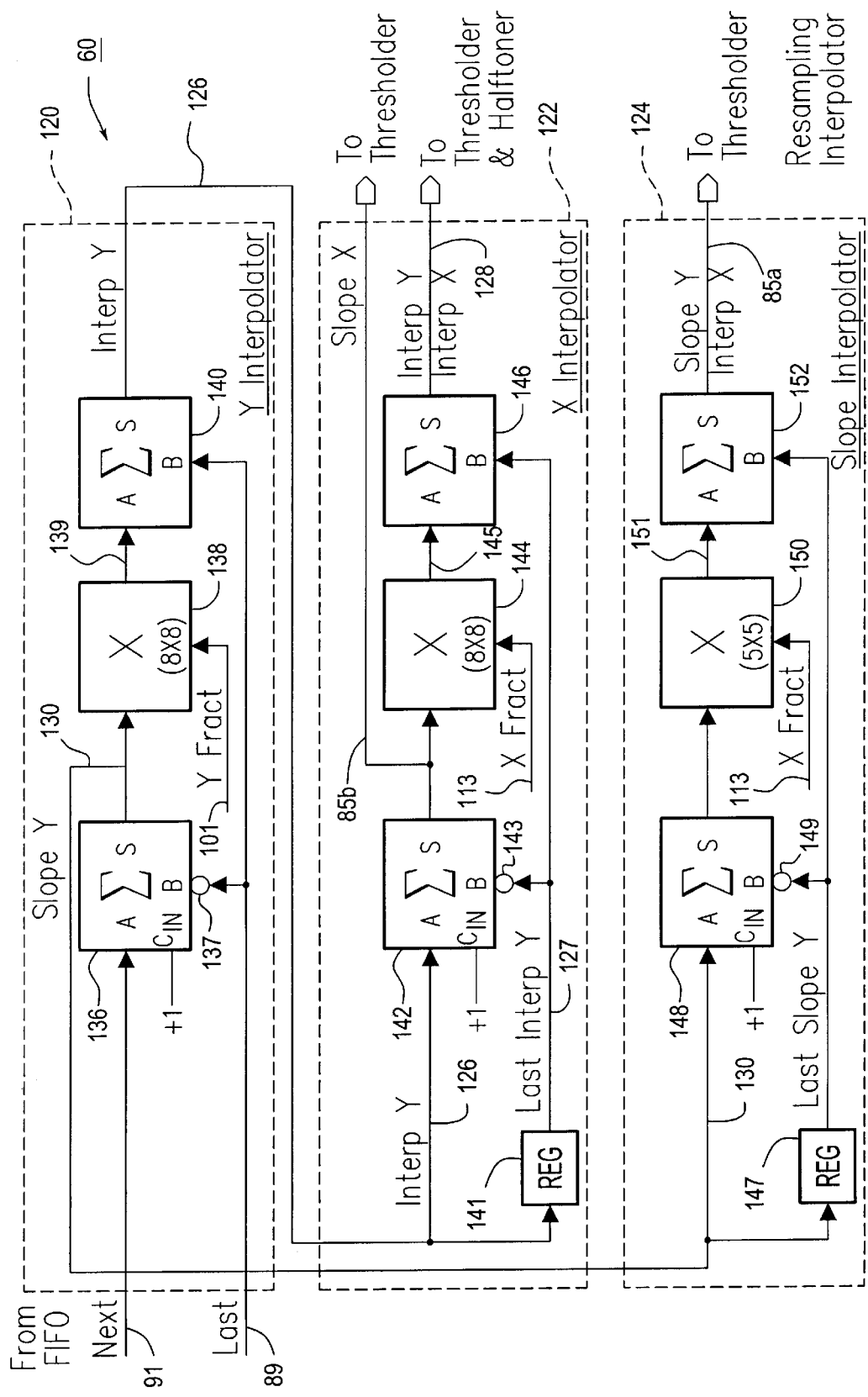
FIG. 3 is a block diagram showing the resampling interpolator of FIG. 2 in greater detail.

FIG. 3 is a detailed block diagram of the resampling interpolator 60. As described above, the outputs of the resampling interpolator 60 are output to the thresholder 68 and the halftoner 70 of the hyperacuity printer 50. First, sampled pictorial data to be used by the halftoner 70 is resampled by the resampling interpolator 60. Second, sampled text and line art data is resampled by the resampling interpolator 60 with an enhancement to the operation of the resampling interpolator 60 by retaining local slope information, such as the rate of change in intensities. This allows predicting where the intensity level of the sampled image will cross the xerographic threshold. The slope information is used by the thresholder 68. Third, the resampling interpolator 60 can be used to resample the input data at different rates to achieve different resolutions, different magnifications and/or different angular orientations of the input data. The resampling interpolator 68 is designed such that the target density or resolution can be written in the memory independently of the input resolution of the data. Finally, electronic registration, scan linearity correction, velocity servoing and photoreceptor skew correction can be performed in the printing system through suitable measurement and feedback of the errors in spot position. This information is provided by the linearity and registration controller 78.

As shown in FIG. 3, the resampling interpolator 60 includes a y interpolator 120, an x interpolator 122 and a slope interpolator 124. The y interpolator 120 includes a first adder 136, a first multiplier 138 and a second adder 140. Similarly, the x interpolator 122 includes a third adder 142, a second multiplier 144 and a fourth adder 146, while the slope interpolator 124 includes a fifth adder 148, a third multiplier 150 and a sixth adder 152. It should be appreciated that in FIG. 3 the first, third and fifth adders 136, 142 and 148 are set up to subtract rather than add, as described in the incorporated '599 patent.

Raster data from the FIFO 58 is input by the resampling interpolator 60 over a LAST signal line 89 and a NEXT signal line 91 and is supplied to the y interpolator 120. These two raster scan lines represent adjacent raster scan lines from the grayscale image data stored in the FIFO 58. As shown in FIG. 3, the raster scan line input over the LAST signal line 89 is subtracted from the raster scan line input over the NEXT signal line 91 using the first adder 136. The output of the first adder 136 represents the y slope information, and is multiplied by the first multiplier 138 by a value representing the fractional part of a number stored in a y accumulator of the phase/resolution controller 66. This value is input into the first multiplier 138 over a signal line 101. The y slope information is also output over the signal line 130 to the slope interpolator 124.

The multiplier 138 performs an 8×8 multiplication, in which the eight most-significant bits of the product generated by the first multiplier 138 is output over a signal line 135 to the second adder 140. The second adder 140 adds the output of the multiplier 138 to the raster data input to the second adder 140 over the LAST signal line 89 to complete the y interpolation. The second adder 140 outputs a sum over a signal line 126 representing the y interpolated data. The output of the second adder 140 is input over the signal line 126 to the third adder 142 of the x interpolator 122.

The x interpolator 122 inputs the output of the second adder 140 over the signal line 126 to the third adder 142. The output of the second adder 140 is also input into a register 141 over the signal line 126. The register 141 delays the output of the second adder 140 by a time equal to one pixel along the fast scan direction. The output of the register 141 is input into the third adder 142 to subtract the delayed output from the second adder 140 from the current output of the second adder 140.

The output of the third adder 142 represents the associated x slope information and is output over a signal line 85$b$ to the thresholder 68. The output of the third adder 142 is also input to the second multiplier 144. The second multiplier 144 multiplies a value, input into the second multiplier 144 over a signal line 113, by the output of the third adder 142. This value represents the fractional part of a number stored in an x accumulator of the phase/resolution controller 66. The eight most-significant bits of the product generated by the second multiplier 144 is added to the output of the register 141 by the fourth adder 146. The output of the fourth adder 146 represents interpolated raster data, and is output over the signal line 128 to the thresholder 68 and the halftoner 70.

The fifth adder 148 of the slope interpolator 124 inputs the y slope information over the signal line 130 from the y interpolator 120. The y slope information is also input into a register 147 over the signal line 130. The register 147 delays the y slope information by the one-pixel time. The delayed y slope information output by the register 147 is input into the fifth adder 148. The delayed y slope information output by the register 147 is subtracted by the third adder 148 from the current y slope information output from the first adder 136. The output of the fifth adder 148 is input to the third multiplier 150. The value output over the signal line 113 is also input into the third multiplier 150. The third multiplier 150 is a 5×5 bit multiplier. The five most-significant bits of the product generated by the third multiplier 150 is output over a signal line 151 to the sixth adder 152. The sixth adder 152 also inputs the delayed y slope information from the register 147. The output of the sixth adder 152 is the associated interpolated slope information, which is output over a signal line 85$a$ to the thresholder 68.

In summary, the y interpolator 120 implements the equation:

INTERPY=YFRACT*(NEXT−LAST)+LAST where:
INTERPY is the y axis interpolated data for the current pixel output by the second adder 140;
YFRACT is the fractional part of the number stored in the y accumulator;
NEXT is the current pixel image data value for the next scanline; and
LAST is the current pixel image data value for the last scanline.

The x interpolator 122 uses the output of the y interpolator 120 and implements the equation:

INTERPYINTERPX=XFRACT*(INTERPY−LASTINTERPY)+ LASTINTERPY, where:
INTERPYINTERPX is the interpolated raster data for the current pixel output by the fourth adder 146;
XFRACT is the fractional part of the number stored in the x accumulator;
INTERPY is the y axis interpolated data for the current pixel output by the second adder 140; and
LASTINTERPY is the y axis interpolated data for the previous pixel output by the register 141.

The slope interpolator 124 implements the equation:

SLOPEYINTERPX=XFRACT*(SLOPEY−LASTSLOPEY)+LASTSLOPEY where:
SLOPEYINTERPX is the y slope of the interpolated value for the current pixel output by the sixth adder 152;
XFRACT is the fractional part of the number stored in the x accumulator;
SLOPEY is the y axis slope data for the current pixel output by the first adder 136; and
LASTSLOPEY is the y slope data for the previous pixel output by the register 147.

Therefore, INTERPYINTERPX, the value of the fourth adder 146 output on the signal line 128, represents the interpolated raster data for the current pixel, the value of the signal output from the third adder 142 on the signal line 85b represents the x slope of the interpolated value for the current pixel, and SLOPEYINTERPX, the value of the sixth adder 152 output on the signal line 85a represents the y slope of the interpolated value for the current pixel. It should be noted that interpolation using these equations is assumed to be linear as long as the value of YFRACT is not changing, or changing very slowly, with respect to the value of XFRACT.

The variables and formulas shown above correspond to an incremental calculation of the formula for determining the resampling intensity as it is actually implemented by hardware according to an embodiment of the invention. The equations described below represent theoretical calculations of the pixel slope and position as well as intensity values.

For a current pixel position, the resampled intensity for this pixel can be determined by a bilinear formulation, as:

$$v(x,y)=a+x\cdot(b-a)+y\cdot(c-a)+x\cdot y\cdot(d-b-c+a) \quad (1)$$

where:
v is the resampled intensity for the current pixel;
a–d are the values of input data pixels arranged in a square array of pixels with a representing the value of the top left pixel, b representing the value of the top right pixel, c representing the value of the bottom left pixel and d representing the value of the bottom right pixel; and
x represents the position of the current pixel of the input image along the fast scan direction, where x increases from left to right; and
y represents the position of the current pixel of the input image of the slow scan, or process, direction, where y increases from top to bottom. Therefore, x and y are the resampled pixel positions for the input data pixels. In addition, the local slope information of the sampled input data can be determined as:

$$sx=v(x+1,y)-v(x,y) \quad (2a)$$

$$sy=v(x,y+1)-v(x,y) \quad (2b)$$

where:
sx is the local x slope for the current (x, y) pixel position;
sy is the local y slope for the current (x, y) pixel position;
v is the resampled intensity for the current (x, y) pixel position;
x represents the current pixel position of the laser beam along the fast scan direction; and
y represents the current pixel position of the laser beam along the slow scan, or process, direction.

It should be understood that the sign of sx and the sign of sy is positive for increasing pixel numerical values from left to right, and top to bottom, respectively. At this point, the resampled values for the current pixel position are directed to either the slope thresholder 68 or to the halftoner 70.

The slope thresholder 68 renders line art or text from the resampled values for the current pixel position by generating linear approximations of edges, or transitions, and converting these approximations into sequences of intensity levels for the one or more laser beams 13 of the output laser 15. As described above, the slope thresholder 68 inputs linear interpolated data and the associated two-dimensional slope information from the resampling interpolator 60 and outputs linear approximations of edges, by thresholding the interpolated data. The two-dimensional slope information is used to determine where the edge that is being rendered is located and how that edge is oriented relative to the one or more laser beams' 13 current position.

Figure 4:
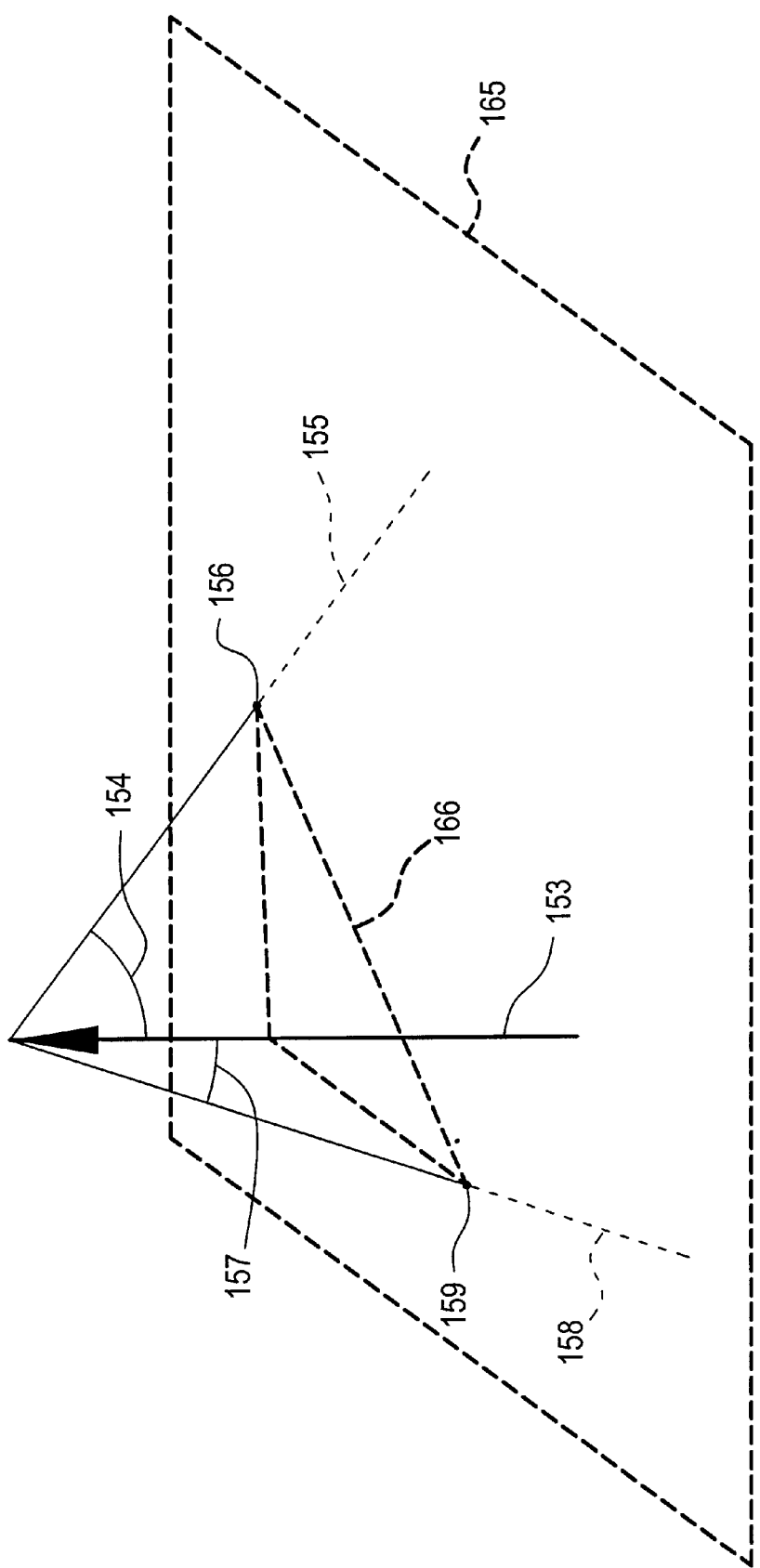
FIG. 4 outlines slope thresholding in two dimensions.

FIG. 4 shows how the slope thresholder 68 uses the intensity and slope information generated by the interpolator to position edges with high precision. The intensity vector 153 and the x and y slope information at the one or more laser beams' 13 current x and y only position is generated by the resampling interpolator 60. The slope thresholder 68 constructs an imaginary xerographic threshold as a plane 165, positioned perpendicular to the intensity vector 153, and having a nominal height of 50% of the maximum possible intensity vector length.

In the x, or fast scan, direction, the slope thresholder 68 generates an imaginary ray 155 extending from the top of the intensity vector 153, at an angle 154 to the intensity vector 153 determined by the x slope information. This imaginary ray 155 intersects the nominal xerographic threshold 165 at a point 156. In the y, or slow scan, direction, the slope thresholder 68 generates an imaginary ray 158 extending from the top of the intensity vector 153, at an angle 157 to the intensity vector 153 determined by the y slope information. This imaginary ray 158 intersects the nominal xerographic threshold 165 at a point 159. The points 156 and 159 determine a line 166 that is an estimate of the feature edge to be rendered at the one or more laser beams' 13 current x and y positions.

Figure 5:
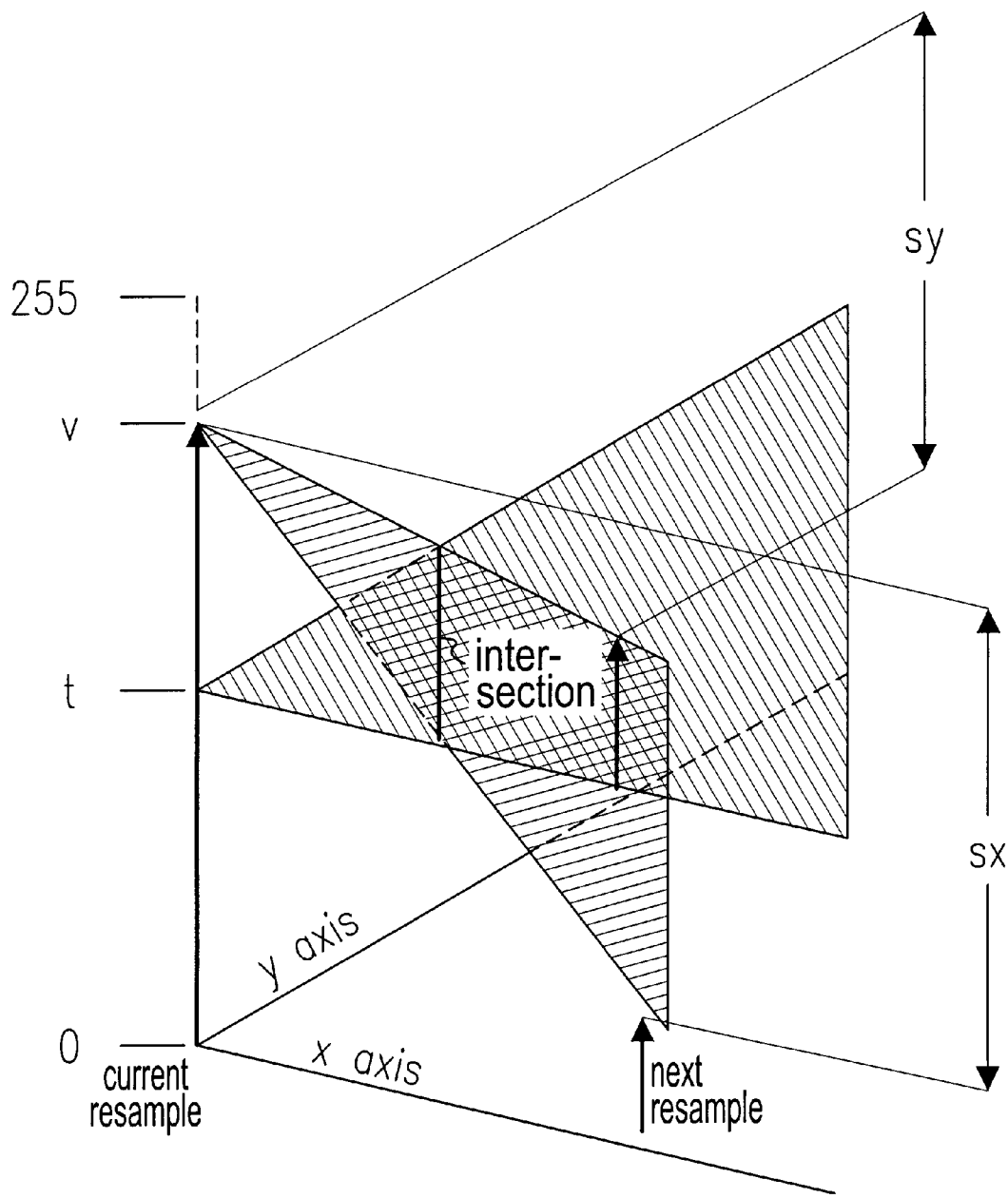
FIG. 5 is a three-dimensional graph showing plane reconstruction.

Edge position values can also be stored in r, θ format. For any given input pixel of the resampled image data, the triplet (v, sx, sy) from Equations 1 and 2 determines a plane in 3-space that passes through the point v and is parallel with the local orthogonal slopes sx and sy, as shown in FIG. 5. The set of sloped planes produced at each resampled input pixel can be understood as a piecewise planar reconstruction of the resampled input data for the current input pixel. A threshold that depends upon the exposure and development process can be defined as a threshold plane parallel with the x and y axes and passing through the value t.

The intersection of the plane determined by the (v, sx, sy) triplet and the threshold plane is a line. This line is a piecewise linear estimate of a point where the original input data for the current input pixel crosses the intensity threshold. This line can have various angles and distances from the center of the current input pixel. The spatial precision of these piecewise linear estimates substantially exceeds the resolution of the image input data. The resolution of the input image data is exemplified by the spacing, or period, of the input square array of the a, b, c and d input pixels of the input image data.

In particular, the formulas defining the distance and angle of the projection onto the x—y plane of the line of intersection can be derived in a straight forward manner, and result in equations 3 and 4:

$$r = \frac{dp \cdot (t - v)}{\sqrt{sx^2 \cdot f^2 + sy^2 \cdot p^2}} \quad (3)$$

$$\theta = \arctan\left(\frac{sy \cdot p}{sx \cdot f}\right) \quad (4)$$

where:

r is the radial distance of a normal line normal to the line of intersection of the two planes and extending from the center of the current input pixel to the line of intersection of the two planes;

θ is the angle in the x—y plane of that normal line with respect to the x axis;

dp is the resample frequency;

ƒ is the resolution of the a, b, c and d pixels of the input data in the fast scan, or x, direction; and p is the resolution of the a, b, c and d pixels of the input data in the process, or y, direction. In particular, the resample frequency dp is set to the optomechanical resolution of the laser scanning device, such as 600 scans per inch.

Figure 6:
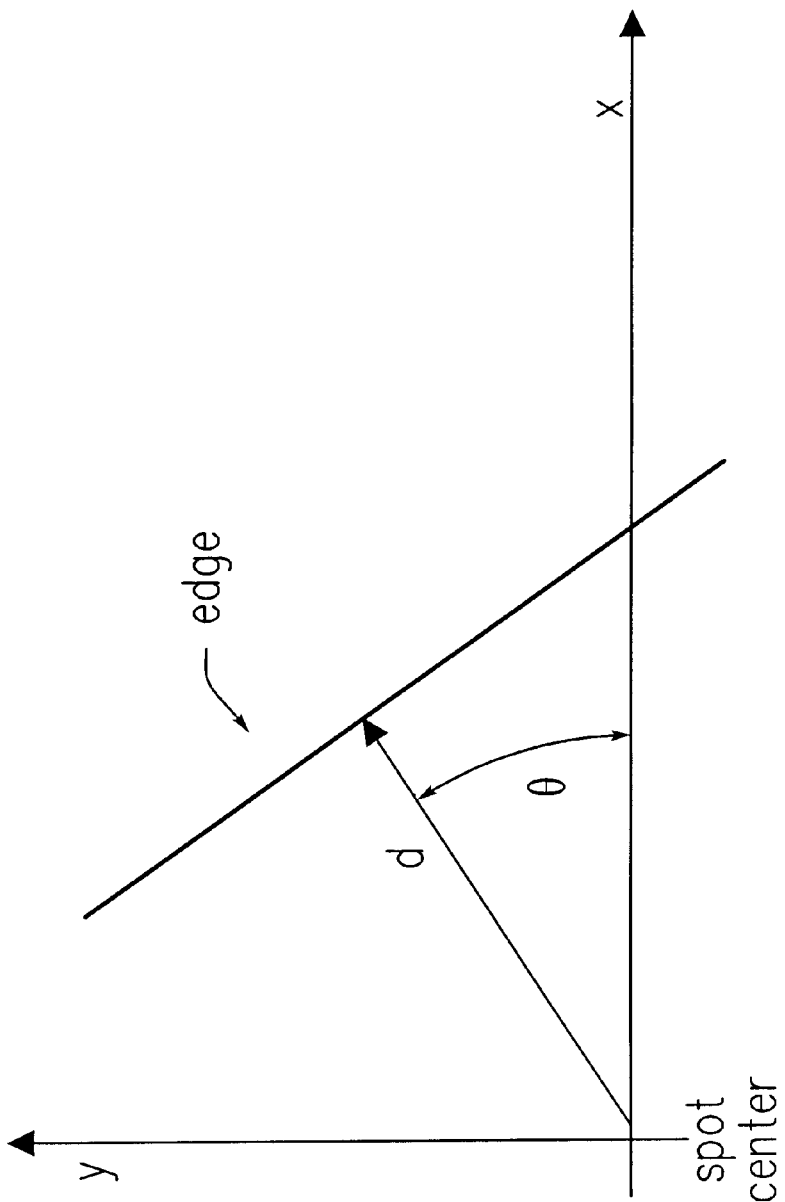
FIG. 6 is a graph showing polar values.

The distance r to the edge is a signed number that has units of scans in both fast and slow directions, assuming square resample intervals. A positive value for the distance r means that the current position of the laser beam is an exposed region. A negative value for the distance r indicates that the current position of the laser beam is an unexposed region. A value of 0° for the angle θ indicates a vertical edge directly in front of the moving laser beam. A value of 90° for the angle θ indicates the edge is parallel to the line of movement of the laser beams. For example, as the one or more laser beams 13 scans across the photo-receptor 14, an edge at an angle of 45° to the fast scan direction would be seen as positive, but have decreasing values for the distance r at a θ of 45°. As the center of a laser beams 13 passes over the edge, the value for the distance r would become decreasingly negative at an angle of 225°, as shown in FIG. 6.

Experiments by the inventor have demonstrated that three or four bits of numerical precision in the sampled image is generally sufficient to print smooth and jaggedness text and line art, often when the source resolutions f and p are below 400 dots per inch. For very small type, for example, 4 or 5 point type, 400 to 600 dots per inch source resolution is recommended.

Once the r and θ values have been obtained that represent edge positions, a driver implements and provides control signals for driving a printing element to render edges.

In one preferred embodiment, the possible slopes and intensity input permutations are determined prior to printing. Once determined, the possible slopes and intensity input values are used to create a look-up table that converts the values to multi-bit intensity level data. The slope thresholder 68 inputs the linear interpolated data and the associated two-dimensional slope information as addresses for the look-up table and outputs the multi-bit intensity level data from the look-up table. The multi-bit intensity levels are then used to drive the one or more laser beams 13 of the laser 15.

The halftoner 70, like the slope thresholder 68, uses edge placement information to deliver the r and θ values to the driver. The halftoner 70 converts the resampled intensity value information from the resampling interpolator 60 into a binary map when pictorials are to be rendered. However, the halftoner 70 does not use slope information from the resampling interpolator 60, but instead uses information from the screen generator 74. Pictorials require many levels of grayscale to be contour free, as well as a fine dot structure to make graininess imperceptible. When representing tone art, that is, pictorials or "natural" images intended for halftoning, sampled data, like that used by the resampling interpolator 68, can be used.

Figure 7:
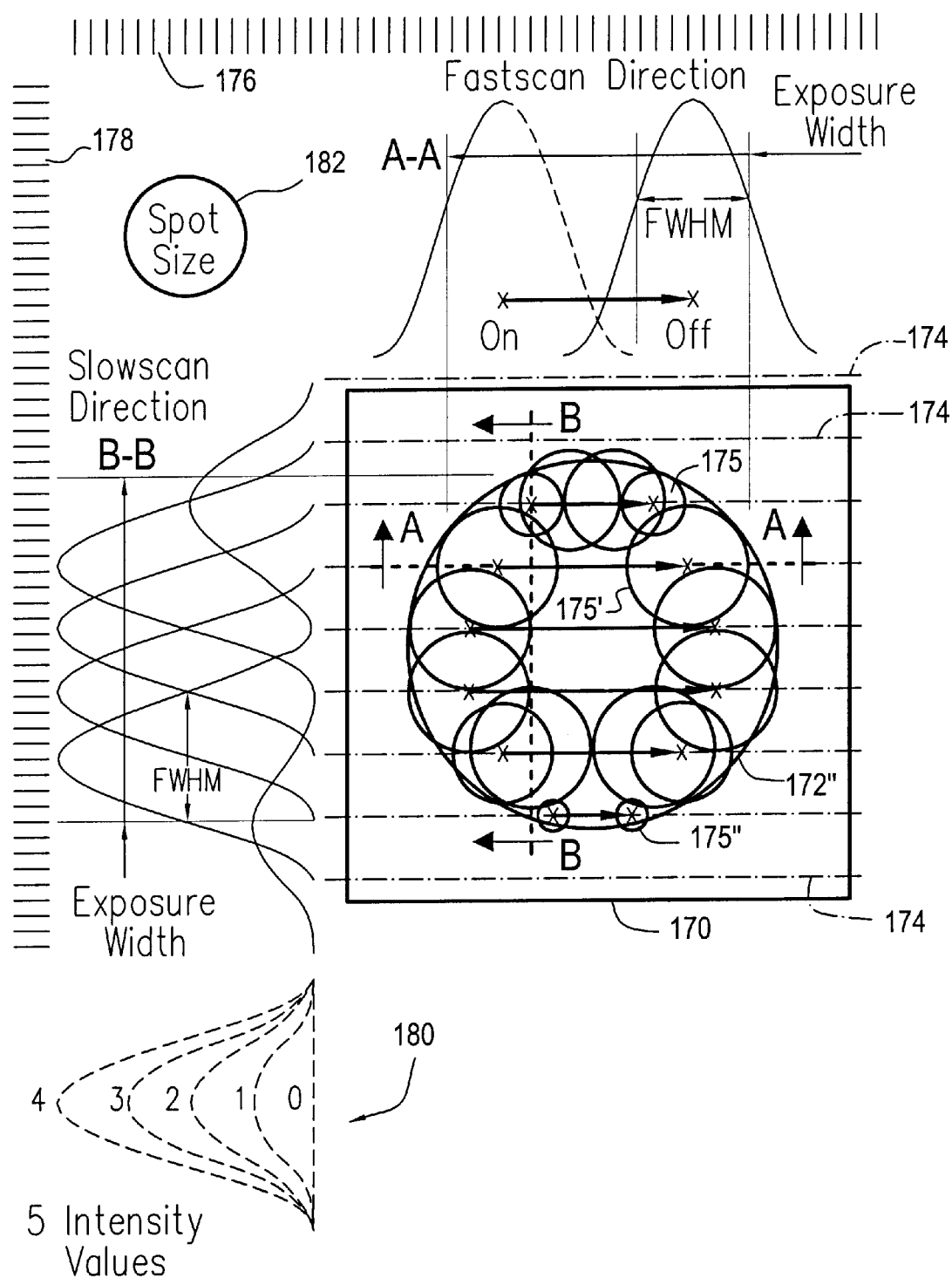
FIG. 7 schematically illustrates forming a halftone dot according to this invention.

FIG. 7 is a diagram representing the full creation of a halftone dot in the hyperacuity printer 50. FIG. 7 shows a halftone cell 170, which for this example is ¹⁄₁₅₀ in. on a side, and a halftone dot 172 to be rendered. In this example, the spot size 182 is ¹⁄₆₀₀ in., with the addressability within cell 170 of ¹⁄₄₈₀₀ in. in both the fast scan and slow scan directions, as indicated by the addressability unit markers 176 and 178. Waveforms above and to the left of the halftone cell 170 represent the fast scan and slow scan exposure profiles of a laser beam 13 as it writes the halftone dot 172. The fast scan exposure profile is taken through a section A—A, and the process, or slowscan, direction exposure profile is taken through a section B—B. The lines 174 represent the scan trajectories of the one or more laser beams 13 and are spaced at ¹⁄₁₂₀₀ in. This means that the scanner is overscanned, which delivers a more linear response of edge placement to intensity adjustment than if the spot were ¹⁄₁₂₀₀ in. However, the system can be tuned to any spot size or any scan spacing.

The resolution of the spot is determined by the spot size 182. While this diagram shows different spot sizes 175, 175', and 175", this does not imply that the resolution has been increased because the spot size is smaller. Rather, the sizes of the spots 175, 175', and 175" only represents where in the process direction the exposure edge will be rendered with the given intensity. In other words, the smaller spots represent the effect the boundary scan has on the rendered edge. In all cases, the spot size 182 is unchanged because the spot size is measured as the "full width at half max" (FWHM) a measure that is intensity invariant.

The halftoner 70 is preferably an array of memory locations that are accessed in a predetermined array format. When it is necessary to determine an r value and a θ value, a look-up table is used to retrieve the r and θ values from the memory, which are delivered to the driver. The method of storing edge position values in r, θ format is described in detail in U.S. Pat. No. 5,696,604, by Douglas N. Curry, which is incorporated herein by reference.

The driver next adds any correction factors representing any device dependencies that arise based on the particular printer 50. That is, up to this point, the r and θ values have been determined independently of any particular idiosyncrasies of the particular printer 50 or any other device-dependent factors that may affect the placement of the hyperacuity edges on the photoreceptor 14.

If the feature edge to be rendered is primarily perpendicular to the fast scan direction, timing is used to render the edge. The printer 50 will use an on-to-off or off-to-on transition that has no intermediate grayscale values to achieve the steepest exposure slope possible. The printer 50 must also take into account the fast scan width of the spot, the quantization of the fast scan clock, and other xerographic development transfer functions. If the feature edge to be rendered is primarily parallel to the fast scan direction, grayscale will be used to achieve subscan precision of the edge. The appropriate grayscale value will be assigned to that memory location. The printer must also take into account the slow scan width of the spot, which depends on the linearity of the intensity-to-edge placement position, the number of grayscale levels being used, the scan pitch, and other xerographic development transfer functions.

It should be appreciated that the method used here to estimate the position of the edge to be rendered is linear. That is, straight lines were used in the explanation shown in FIGS. 4 and 5 for simplicity. However, the values downloaded to the look-up table are determined in advance of printing. Therefore, the time to determine those values is of lesser importance. Therefore, more complicated methods for determining the position of the edges are quite appropriate, and are recommended.

Figure 13:
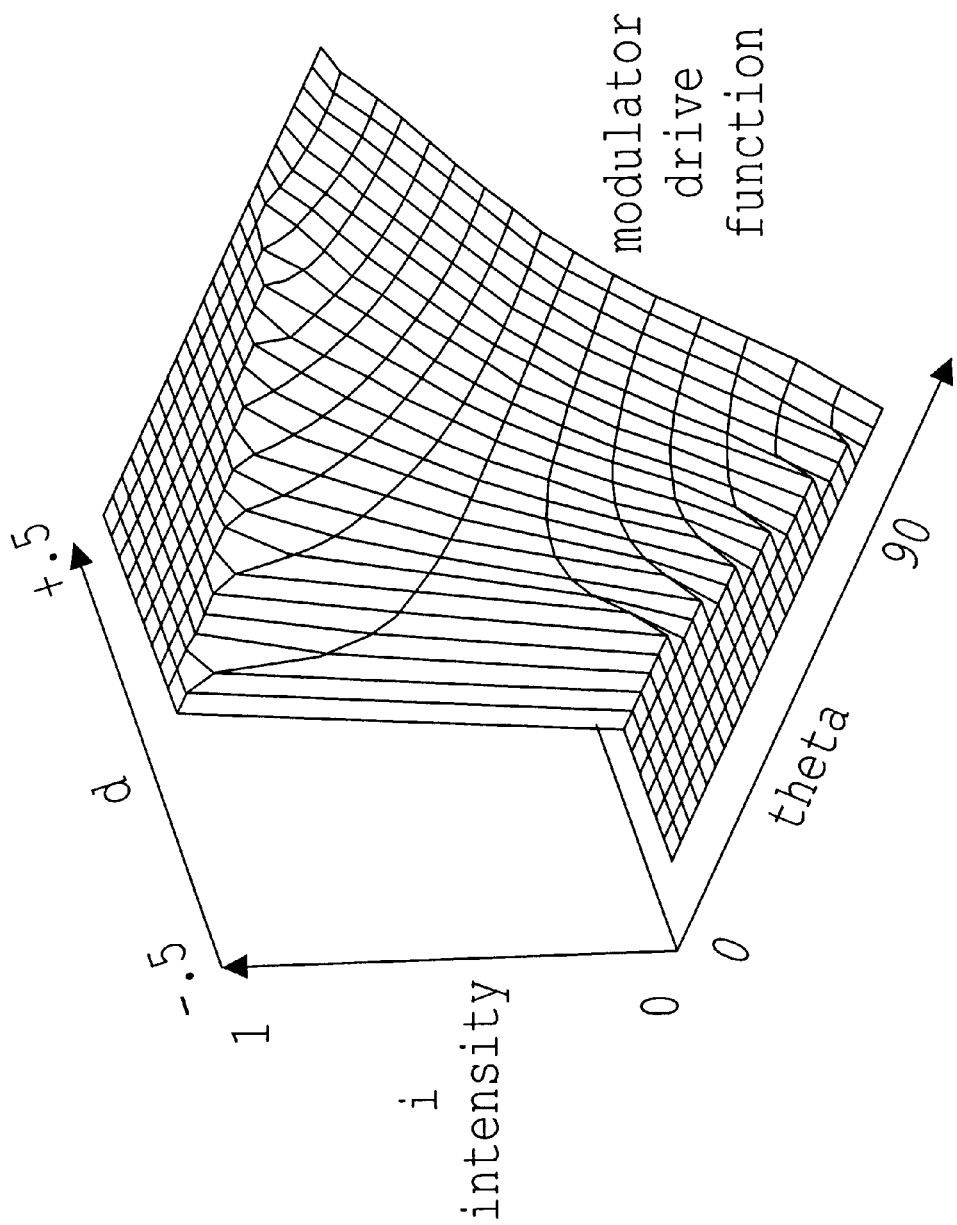
FIG. 13 shows the modulator drive function in relation to an intensity i, a radius r and an angle $\Phi$.

The r–θ format obtained from the slope thresholder 68 or the halftoner 70 is a prediction of where the edges should be. It is up to the intensity modulator 51 to make sure the edges are placed at those positions. Thus, the modulator drive function implemented by the intensity modulator 51 is essentially a continuous function that arbitrates between two competing output modulation techniques, a temporal modulation technique and an intensity-summing modulation technique. FIG. 13 shows the modulator drive function as it relates to the intensity value and the r and θ coordinates.

To carry out the invention, the amplitude, duty cycle, and/or pulse width of the one or more laser beams 13 are serially modulated, collectively referred to herein as the "serial modulation" of the laser beam 13 by the intensity modulator 51 in accordance with successive multi-bit digital data values. These data values are clocked out of the buffered data source 23 serially in response to data clock pulses that are time-synchronized with the scan of the scan spot within the raster scan pattern. Thus, the data clock frequency can be selected to map the data onto the raster scan pattern at any desired resolution, using either the same or different resolutions in the fast scan and the process directions. As will be appreciated, the data may be preprocessed according to this invention to print halftoned images and/or text and other types of line art. Thus, the data source 23 generically represents any suitable source of grayscale data for intensity modulating the one or more laser beams 13.

When the angle θ is nearly 0° or nearly 180°, indicating that an almost vertical edge is to be produced, the temporal modulation is at its maximum as the beam is scanned. Edges are placed by high speed transition of full laser power. Since, for positive exposure or write black, the spot trailing radius should be tangent to the edge during a turn-off-to-on event, and the spot leading radius should be tangent to the edge during a turn-on-to-off event, a fast scan bias is added to the temporal modulation which is at its maximum as the beam is scanned to compensate any lack of correspondence between the power transition event and the spot center passing over the edge. By adjusting this value, the widths of lines in the fast scan direction can be calibrated to be equal to reference line widths made in the slow scan direction. This bias value is typically constant for any particular printer design, and depends on how impulsive the fast scan spot size is, and on the development response, including write white or write black.

According to one embodiment of the invention, the hyperacuity printer 50 uses a time base at, or temporal modulation rate of, the laser 15 that is eight times the resample rate. Resampling occurs at 600 times per inch. Thus, hyperacuity precision, or addressability, for the fast scan direction corresponds to 4800 dots per inch.

Figure 12:
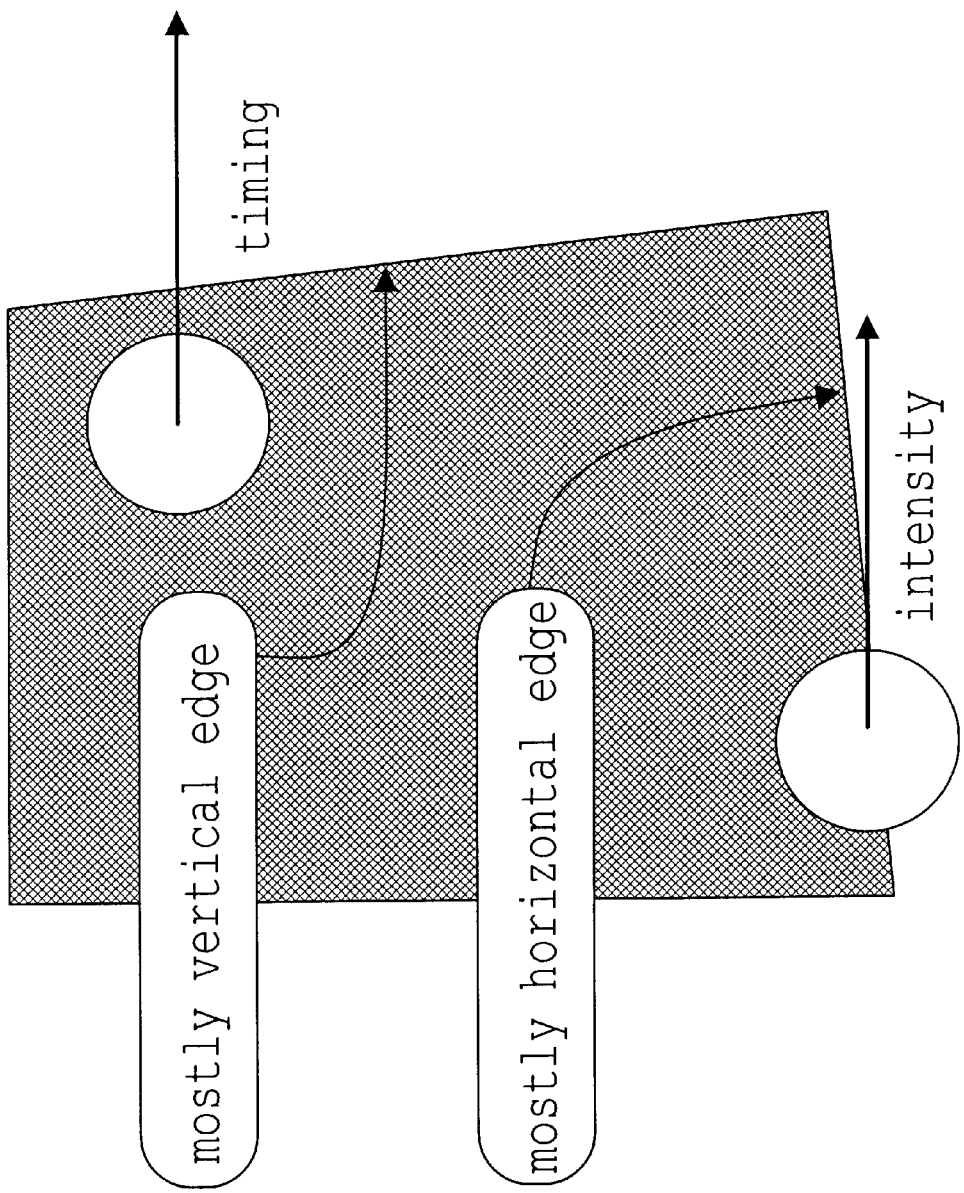
FIG. 12 shows how variable intensities are used to adjust the position of mostly horizontal edges in the process direction.

When the angle θ is nearly plus 90° or minus 90°, indicating an almost horizontal edge, intensity summing between over-lapping intermediate, or hyperacuity scanlines is used to position the edges. For example, to shift an edge by a quarter of a scanline, approximately 25% power can be delivered to an intermediate scanline. Unfortunately, the relationship between the desired edge position and laser intensity is non-linear. The graph between desired edge position and laser intensity is the edge reproduction curve (ERC). FIG. 12 shows how variable intensity is used to adjust the position of mostly horizontal edges in the process (slow scan) direction.

Because maintaining square addressability for the fast and slow directions is desirable, at least 4800 dots per inch addressability for the slow scan direction is required. Due to the foregoing nonlinear intensity vs. edge position relationship, more intensities than eight must be available to the development system in order to assure that slow scan quantization is not less than 1/4800 According to an embodiment of the invention, the hyperacuity printer 50 uses a four-bit digital-to-analog converter, allowing sixteen edge positions between scanlines. When using 600 scans per inch in the slow-scan direction, the hyperacuity precision for the slow scan direction corresponds to less than 9600 dots per inch, but at least 4800 dots per inch addressability.

Figure 8:
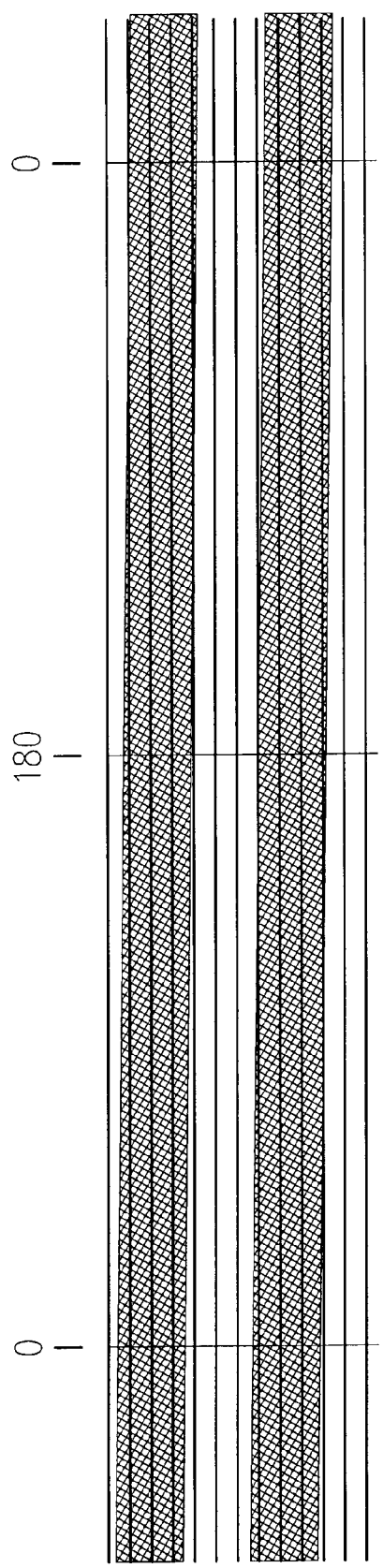
FIG. 8 shows a grating printed on an output medium formed by lines that are closely spaced and not quite horizontal.
Figure 9:
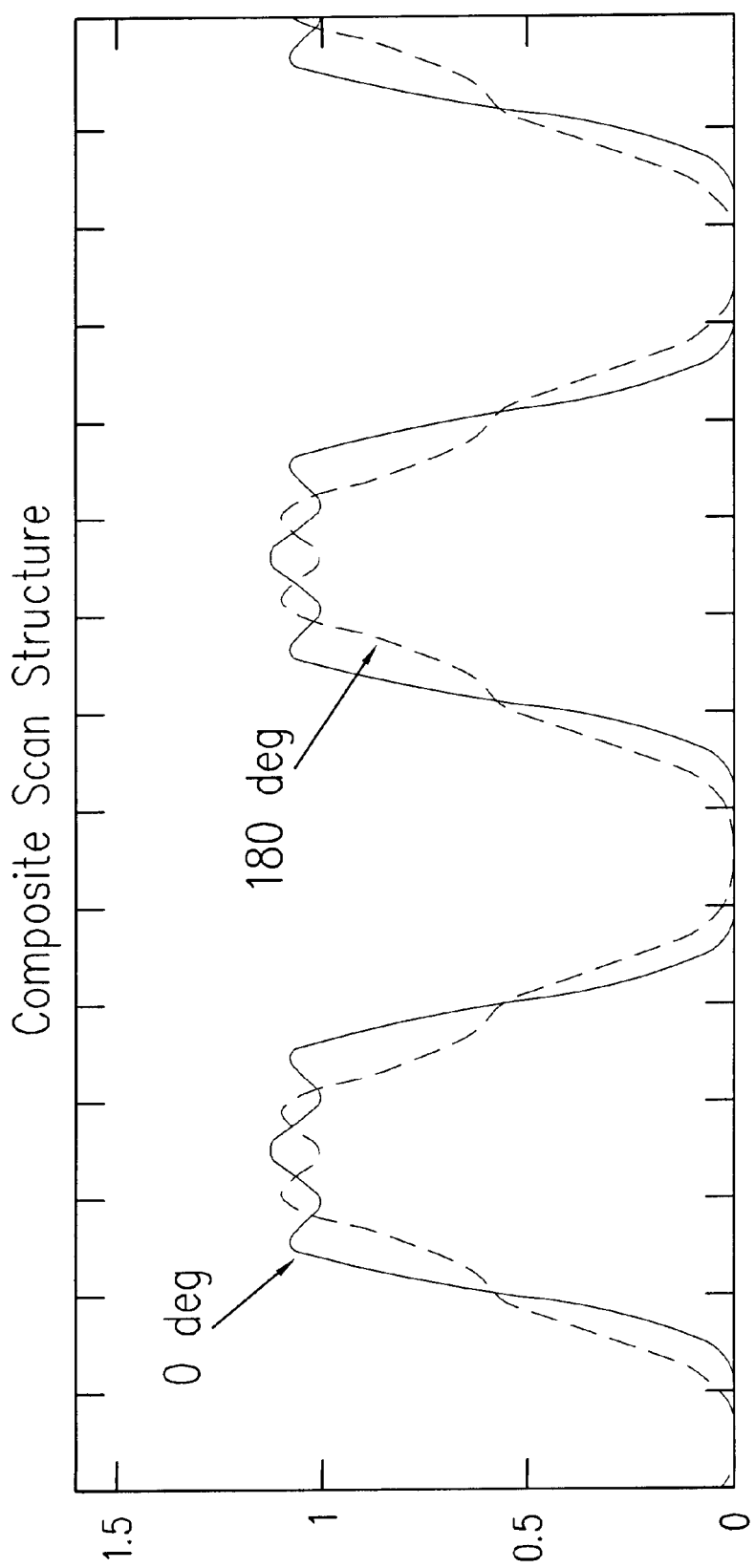
FIG. 9 shows two intensity profiles at 0° and 180° positions of the grating shown in FIG. 8.

An edge reproduction curve is an empirically obtained relationship between slow scan intensity verses desired edge position r. Its characterization provides convincing proof of the hyperacuity printer's 50 ability to control edge position with hyperacuity precision. FIGS. 8 and 9 show the problem being addressed.

Lines that are closely spaced and not quite horizontal are printed on the photo-receptor 14, forming a grating, as shown in FIG. 8. Since these lines have a slight slope, their process direction intensity continuously precesses through a 360° phase relationship with the scan structure. The centerlines of the intensity profiles alternately coincide, at 0°, with an individual laser scan, or fall halfway between two adjacent scans, at 180°, as the profile is observed at different horizontal positions across the photoreceptor 14.

Due to the non-linear relationship between intensity and edge position, the individual line widths in the grating are not constant over the 360° cycle. This causes an observed change in tone when viewing the printed grating structure. FIG. 9 shows two intensity profiles sliced through the gratings shown in FIG. 8, one intensity profile at 0°, the other intensity profile at 180°. These intensity profiles show the differences in the scan profiles for these two phases. Using the 0° intensity profile, which has no intermediate intensity as a reference, the edge reproduction curve is used to correct the intermediate intensities at out-of-phase positions to maintain line width invariance.

Figure 10:
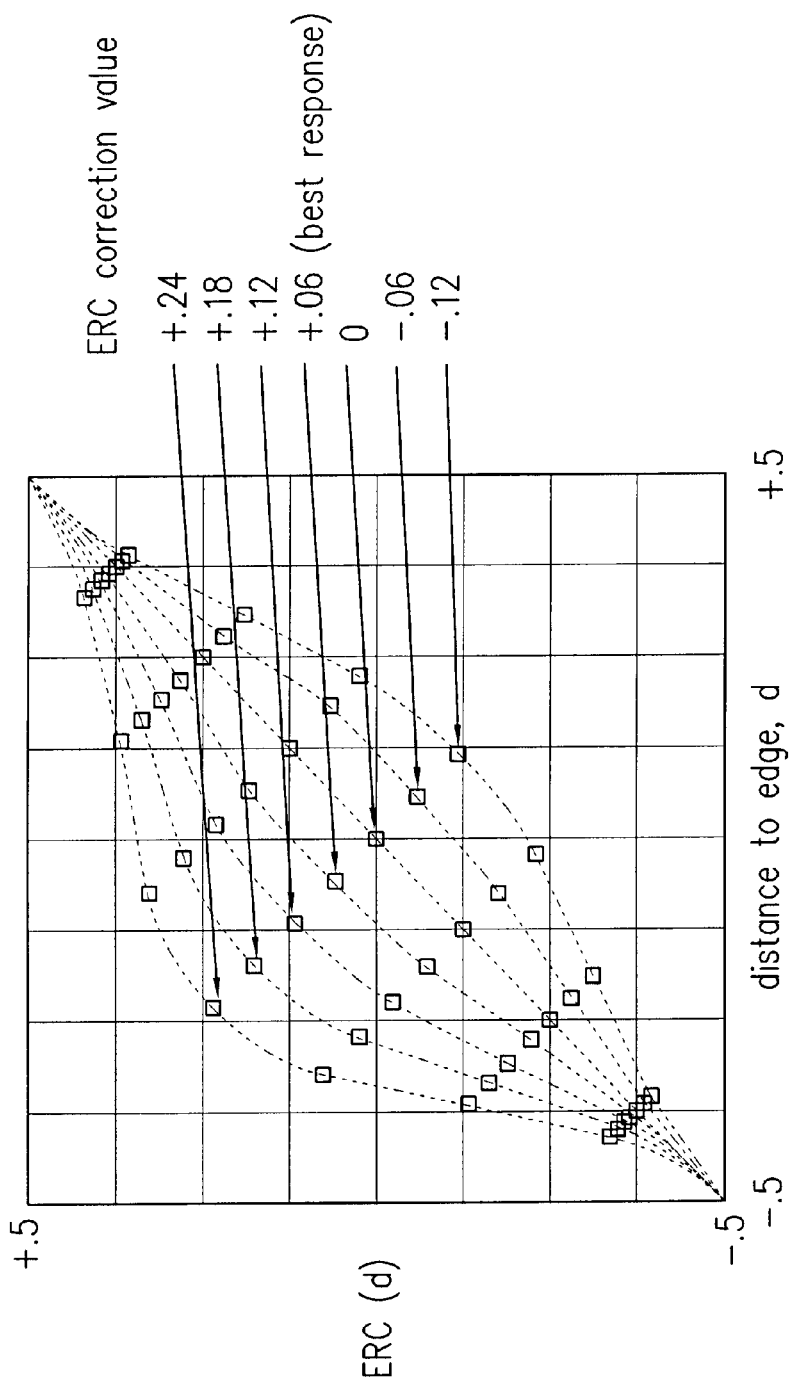
FIG. 10 shows a series of spline-based edge reproduction curves, progressing from very negative to very positive edge reproduction curve correction values.
Figure 11:
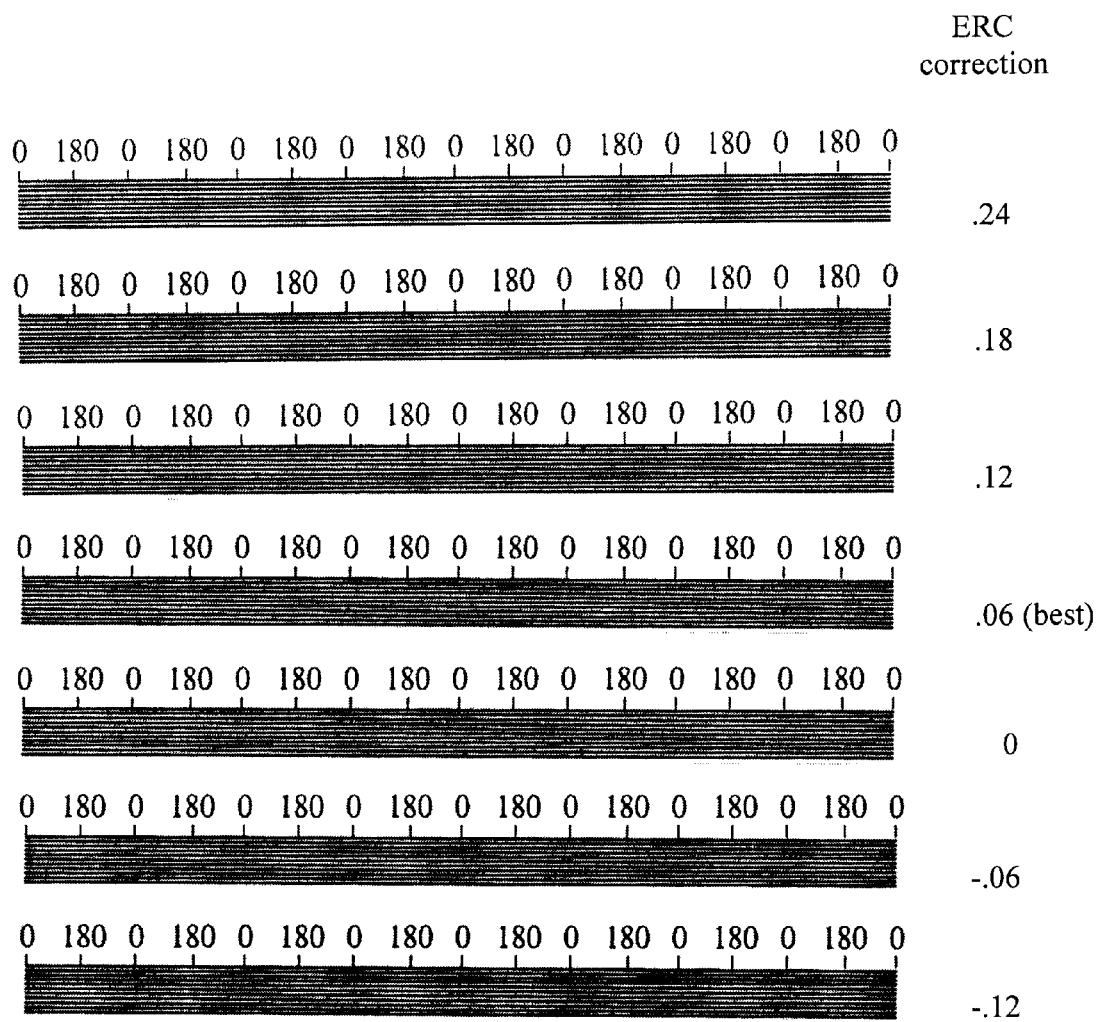
FIG. 11 shows the grating of FIG. 8 adjusted using the edge reproduction curves shown in FIG. 10.

FIG. 10 shows a series of spline-based edge reproduction curves progressing from very negative to very positive edge reproduction curve correction values, each of which was used to produce the xerographic prints of the gratings shown in FIG. 11. In FIG. 10, the horizontal axis is the distance r to the edge. The vertical axis is the corrected distance, ERC(r). The gratings of FIG. 11 were visually judged for their uniformity of grayscale tone, as their line widths varied from 0° through 360°. The best results were obtained at the edge reproduction curve labeled with the 0.06 correction. The 0.06 label is an arbitrary number used to create the splines shape.

The series of gratings shown in FIG. 11 illustrate the hyperacuity printer's 50 ability to control phase errors in a systematic manner through a complex development system. The tone at the out-of-phase regions progress from relatively dark tone, at an edge reproduction curve correction value of 0.24, through imperceptible tone differences near correction values of 0.06, to relatively light tones at a correction value of –0.12.

By example, the gratings of FIG. 1 were originally printed as slope-thresholded hyperacuity line art on a modified 600 scans per inch standard printer, as in the gratings of FIG. 8. The input pixel data is 300×300×8 bits. The lines are spaced 5 pixels apart and are sloped one pixel in 360. Seven prints were manually cut and pasted together, then subsequently scanned in on a 600 dpi scanner as an 8 bit picture. Although the smooth edges have been lost due to the halftoning, the variation in tone between 0° and 180° is a direct indication in the change in width of the original lines.

The foregoing discussions exemplify the fact that laser printers that improve edge placement performance beyond their optically fixed resolution require two different modulation techniques, a temporal modulation technique for the fast scan direction, and an intensity-based modulation technique for the slow scan direction. The problem of combining these two orthogonal techniques in a continuous manner is addressed by the intensity modulator 51 that implements the modulator drive function, which in turn is enabled by using a digital-to-analog converter. The intermediate polar r and θ format for edge information is a natural way to implement the modulation drive function. By observing that the desired intensity of the laser diode is roughly directly proportional to r and inversely proportional to the sine of the angle θ of the edge, the following basic relationship can be formed:

$$i = \frac{r}{|\sin(\theta)|} \tag{5}$$

where:
  i is intensity for the laser diode delivered to the digital-to-analog converter;
  r is the radial distance to the edge; and
  θ is the angle of the edge.

In its completed form, i is the intensity of the laser one or more beams 13 delivered directly to the digital-to-analog converter 76. When the angle θ is 0°, indicating a vertical edge directly in front of or behind the traveling spot, Equation 5 returns plus or minus infinities as the laser spot distance from the edge goes from positive to negative. These infinity values are truncated to an output between 0 and 1, which is not shown by Equation 6. When the angle θ is plus 90° or minus 90°, indicating a horizontal edge, the Equation 5 returns to linear relationship between the distance r to the edge and the laser's intensity i. The fast scan bias, fb, and slow scan erc(r) corrections are substituted into this basis relationship and result in the modulator drive function:

$$i = \frac{erc(r) + fb \cdot \cos(\theta)}{|\sin(\theta)|^p} + 0.5 \tag{6}$$

where:
  i is the intensity for the laser diode delivered to the digital-to-analog converter;
  erc(r) is the corrected radial distance to the edge;
  fb is the fast scan bias; and
  θ is the angle of the edge.

Since the fast bias is only required in the fast scan direction, it is factored with cosine θ. The power of the denominator (p) controls the transformation rate between the two competing behaviors. A high power will cause the progression from step behavior at 0° to linear behavior at 90° to be very abrupt at around 45°, while a lower power will allow for a smoother transition. The added 0.5 provides an offset to bias the symmetrical −0.5 to +0.5 output range to a 0 to 1.0 range corresponding to full-off and full-on of the one or more laser beams 13. The final step of truncating into the 0 to 1.0 range, scaling by 16 and quantization to 4 bits is not shown in Equation 6, but is shown in the graph for the case where p=2. Note that the "best response" erc(d) correction shape from FIG. 10 can be observed in the response at 90°, as shown in FIG. 11.

The intensity modulator 51 uses a general digital-to-analog converter to control the laser intensity for driving the laser 15 using the intensity values obtained as described above. There are various forms of digital-to-analog converters, all of which can be used by this method. A classic digital-to-analog converter can generate grayscale output electronically and timing information depending on how quickly the converter can change values. A pulse-width modulator can generate grayscale data depending on the width of the data output and timing information based on turning-on and turning-off. A counter also generates an output that turns the laser 15 on-and-off. A high speed shift register can generate grayscale data by dithering its bits from on-to-off or from off-to-on. The dithering algorithm can be the same as that disclosed in U.S. Pat. No. 5,216,443, to Douglas N. Curry, which is incorporated herein by reference.

Figure 14:
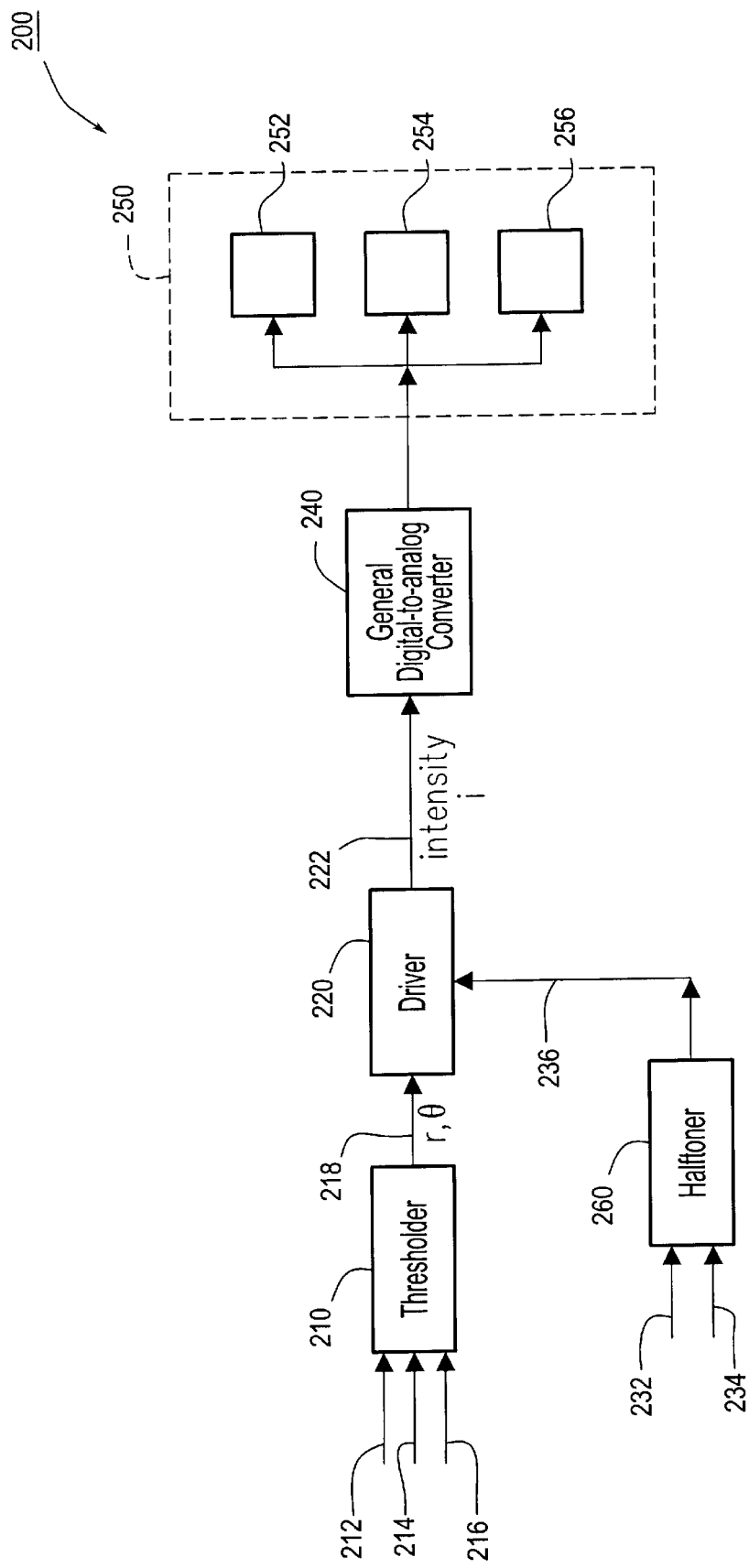
FIG. 14 is a block diagram showing another representation of a portion of the hyperacuity subsystem of FIG. 3.

FIG. 14 shows another block diagram of a portion 200 of the hyperacuity printer 50 according to an embodiment of the invention. A thresholder 210 outputs to a driver 220 implementing the modulator drive function that outputs to a general digital-to-analog converter 240, which in turn drives the print element 250, including an electronic digital-to-analog converter 252, a shift register 254 and/or a pulse width modulator 256.

As shown, the thresholder 210 receives three signals 212–216 lines from the resampling interpolator 68. These three signal lines 212–216 represent the interpolated data, the x slope, and the interpolated y slope, respectively. Using these input values, the thresholder 210 renders a multibit intensity value to be used by the laser 15. This value can be determined in real time or stored in a look-up table implemented in memory. This value may also be stored, and is output as r and θ values over the signal lines 218.

When the thresholder 210 is implemented as a look-up table, the resulting intensity values i are predetermined and stored in the memory. During operation, the values on the signal lines 212–216 are used to address the memory for the value of the intensity i corresponding to the inputs. The slope values take the place of absolute page coordinates to help form the address. Therefore, for each possible address combination, there is a predetermined intensity value corresponding to each address. As previously mentioned, the value of the intensity i may also be implemented such that the intensity i is determined during operation by using a fast processor or other circuitry.

It should be noted here that often memory access speed is limited to somewhat slower than the access requirements for retrieving data at the fast can addressability resolution, for instance 4800 data per inch, or over 200 MHz in the example system. In that case, the memory fetch for the next n fetches is determined beforehand, taking into account the spot's estimated position during that time, and the accesses for all n fetches are provided in one fetch in a memory that is n times bigger than is otherwise required. Those n m-bit values can then be loaded in parallel into the driver 220. The driver 220 outputs an intensity value i over a signal line 222, which is determined as described above using the r and θ values.

As described earlier, the r and θ values can also be derived from a halftoner 230. The halftoner 260 inputs signals on two signal lines 232 and 234 from the resampling interpolator 60. Using these input values, the halftoner 230 renders edge position information for delivery to the driver 220 over a signal line 236. The edge position information can be stored and is in r and θ format.

The intensity value i is input over the signal line 222 to the classic digital-to-analog converter 240 that uses the intensity value to drive the print element 250. The classic digital-to-analog converter 240 can drive either the electronic digital-to-analog converter 252, the shift register 254 or the pulse width modulator 256.

Figure 15:
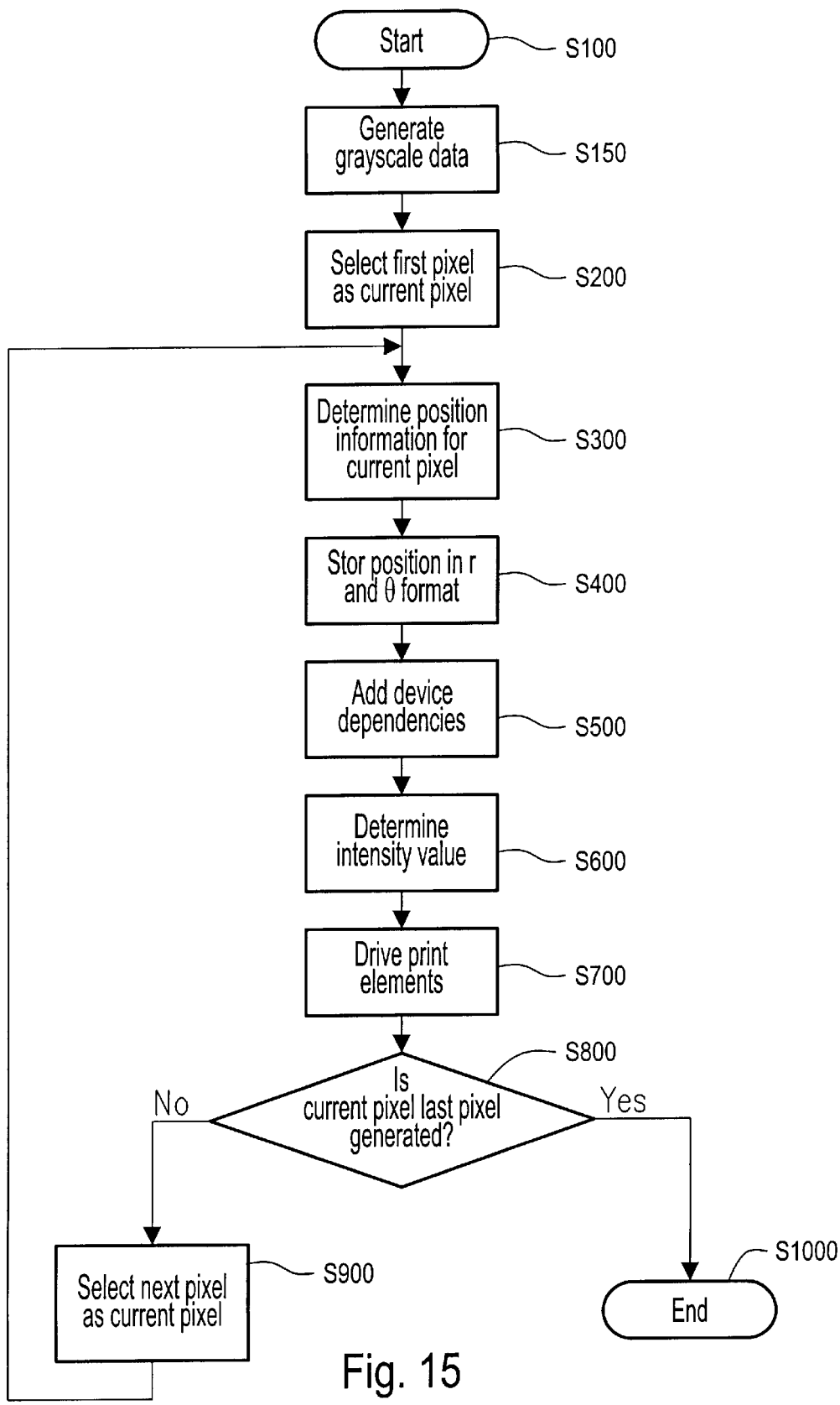
FIG. 15 is a flowchart outlining one method for generating high resolution image data from lower resolution image data according to this invention.

FIG. 15 is a flowchart outlining one preferred method for driving a printing element using text and line art information generated from a sampled input image, according to this invention. Starting in step S100, control continues to step S150 where grayscale information representing low resolution image information is accumulated. Then, in step S200, the first pixel from the grayscale data is selected as the current pixel. Next, in step S300, precise edge position information is determined for the current pixel. Control then continues to step S400.

In step S400, the edge position information is converted to r and θ coordinates. Next, in step S500, device dependencies are added to the r and θ coordinates, so that the edge placement values are no longer independent of the device parameters. Then, in step S600, intensity values are determined based upon the revised r and θ values determined in step S500. Next, in step S700, the intensity values are used to drive a printing element, such as an array of laser diodes. Control then continues to step S800.

In step S800, the grayscale data is checked to determine if the current pixel is the last pixel of the grayscale data. If the current pixel is not the last pixel, control continues to step S900. Otherwise, control jumps to step S1000. In step S900, the next pixel from generated grayscale data is selected as the current pixel and control returns to step S300. In step S1000, the process ends.

Figure 16:
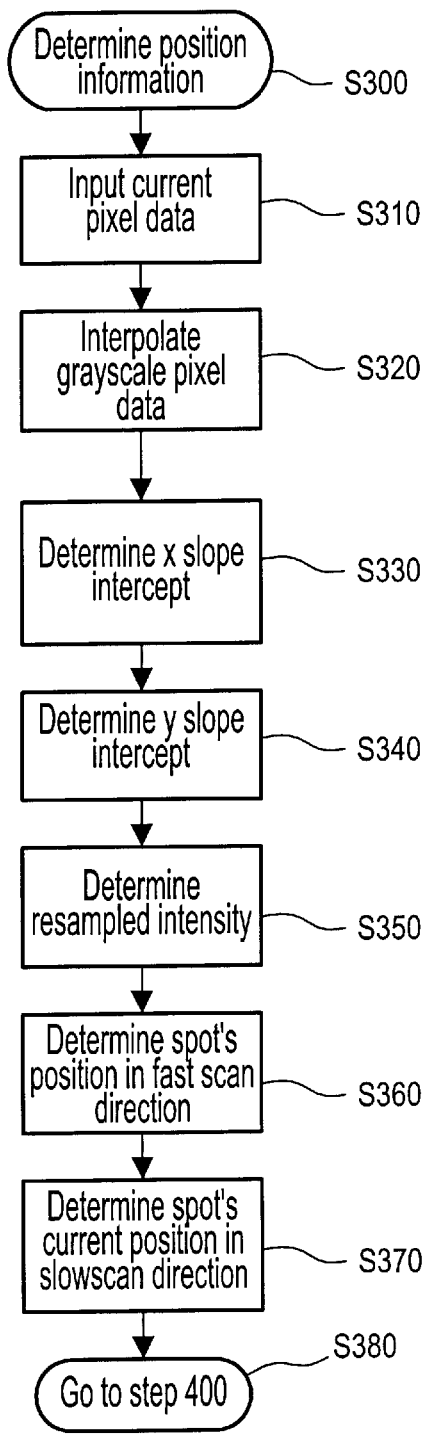
FIG. 16 is a flowchart outlining determining the position for a current pixel.

FIG. 16 is a flowchart outlining in greater detail determining the position information for a current pixel of step S300. Beginning in step S300, control continues to step S310, where the current pixel data is input. Then, in step S320, the gray scale pixel data is interpolated. Next, in step S330, the x slope intercept is determined. Then, in step S340, the y slope is determined. Control then continues to step S350.

In step S350, the resampled intensity is determined. Then, in step S360, the spot's current position in the fast scan direction is determined from left to right. Next, in step S370, the spot's current position in the slow scan, or process, direction is determined from top to bottom. Then, in step S380, control is returned to step S400.

As shown in FIGS. 2, 3 and 14, the intensity modulator according to the invention is preferably implemented as an ASIC. However, the intensity modulator can also be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 15 and 16, can be used to implement the intensity modulator.

While the invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention.

What is claimed is:

1. A method for driving an image forming apparatus to form an image at a first two-dimensional resolution based on image data provided at a second two-dimensional resolution that is lower than the first two-dimensional resolution, the first and second two-dimensional resolutions each including a resolution in each of a fast-scan direction and a resolution in a slow-scan direction, the fast-scan direction resolution of the first two-dimensional resolution being higher than the fast-scan direction resolution of the second two-dimensional resolution and the slow-scan direction resolution of the first two-dimensional resolution being higher than the slow-scan direction resolution of the second two-dimensional resolution, the method comprising:

receiving image data at the second two-dimensional resolution corresponding to an edge within an image;

generating edge position information at the first two-dimensional resolution from the second two-dimensional resolution image data corresponding to an edge; and converting the edge position information to drive values at the first two-dimensional resolution for driving at least one image forming element of the image forming apparatus.

2. The method according to claim 1, further comprising outputting the drive values to the at least one image forming element of the image forming apparatus.

3. The method according to claim 1, wherein the at least one image forming element includes a plurality of lasers.

4. The method according to claim 1, wherein the at least one image forming element includes an LED bar having a plurality of LEDs.

5. The method according to claim 1, wherein the edge position information is line information.

6. The method according to claim 1, wherein the edge position information is polar coordinates.

7. The method according to claim 6, wherein:

the edge portion information corresponds to a current pixel at the second two-dimensional resolution; and the drive values are proportional to a distance to the image edge of the current pixel from a center of an output spot of each of the at least one image forming elements and inversely proportional to an angle of the image edge to a direction of travel of the center of the output spot of each of the at least one image forming elements.

8. The method according to claim 6, wherein the drive values correspond to an intensity i:

$$i = \frac{d}{|\sin(\theta)|},$$

where:

i is the drive value;

d is the distance to the image edge; and

θ is the angle of the image edge.

9. The method according to claim 6, wherein the drive values correspond to an intensity i:

$$i = \frac{erc(d) + fb \cdot \cos(\theta)}{|\sin(\theta)|^P} + .5,$$

where:

i is an intensity of the drive value;

erc(d) is a slow-scan error correction;

d is the distance to the image edge;

fb is a fast scan bias; and

θ is the angle of the image edge.

10. The method according to claim 1, wherein the input image data is binary data.

11. The method according to claim 1, wherein the input image data is grayscale data.

12. A hyperacuity image forming system for forming an image at a first two-dimensional resolution from input image data provided at a second two-dimensional resolution that is lower than the first two-dimensional resolution, the first and second two-dimensional resolutions each including a resolution in each of a fast-scan direction and a resolution in a slow-scan direction, the fast-scan direction resolution of the first two-dimensional resolution being higher than the fast-scan direction resolution of the second two-dimensional resolution and the slow-scan direction resolution of the first two-dimensional resolution being higher than the slow-scan direction resolution of the second two-dimensional resolution, the system comprising:

an edge information generator circuit that provides edge placement information at the first two-dimensional resolution from the input image data;

a driver, implementing a modulator drive function, that transforms the edge placement information at the first two-dimensional resolution received from the edge information generator circuit into modulation information; and a modulator that accepts modulation information from the driver and drives at least one image forming element of the hyperacuity image forming system to form the image.

13. The hyperacuity image forming system according to claim 12, further comprising a photosensitive recording medium, wherein:

the at least one image forming element includes an output scanning device that forms scan spots on the photosensitive recording medium; and the modulator drives the output scanning device by intensity modulating the scan spots.

14. The hyperacuity image forming system according to claim 13, wherein the edge information generator circuit comprises:

a resampling interpolator that provides information about a local rate of change of intensity of a current pixel of the image data at the second two-dimensional resolution in both fast scan and slow scan direction;

a halftoner, connected to the resampling interpolator, that renders halftone image data at the first two-dimensional resolution for the current pixel from the input image data based on local rate of change information of the current pixel;

a thresholder, connected to the resampling interpolator, that renders line art and text image data at the first two-dimensional resolution for the current pixel from the input image data based on the local rate of change information of the current pixel.

15. A method for driving a printer having at least one image forming device to form an output image at a first two-dimensional resolution from grayscale image data having a second two-dimensional resolution lower than the first two-dimensional resolution, comprising:

inputting image data at the second two-dimensional resolution corresponding to a plurality of pixels of this image data including a current pixel of the image data;

converting the input image data to polar values for the current pixel;

determining intensity data at the first two-dimensional resolution for the at least one image forming device from the polar values; and driving the at least one image forming device with the determined intensity data to form the output image at the first two-dimensional resolution for the current pixel.

16. The method according to claim 15, wherein the determined intensity data are proportional to a distance to an image edge from a center of the current pixel and inversely proportional to any dependency on an angle of the image edge.

* * * * *